(12) United States Patent
Hirozawa et al.

(10) Patent No.: US 9,337,697 B2
(45) Date of Patent: May 10, 2016

(54) HYBRID CONSTRUCTION MACHINE

(75) Inventors: Mitsunori Hirozawa, Hiroshima (JP); Yoichiro Yamazaki, Hiroshima (JP)

(73) Assignee: KOBELCO CONSTRUCTIONS MACHINERY CO., LTD., Hiroshima-shi (JP)

( * ) Notice: Subject to any disclaimer, the term of this patent is extended or adjusted under 35 U.S.C. 154(b) by 417 days.

(21) Appl. No.: 14/111,339

(22) PCT Filed: Apr. 11, 2012

(86) PCT No.: PCT/JP2012/002507
§ 371 (c)(1),
(2), (4) Date: Oct. 11, 2013

(87) PCT Pub. No.: WO2012/140879
PCT Pub. Date: Oct. 18, 2012

(65) Prior Publication Data
US 2014/0026551 A1    Jan. 30, 2014

(30) Foreign Application Priority Data

Apr. 12, 2011    (JP) ................................. 2011-088013

(51) Int. Cl.
*H02K 9/20* (2006.01)
*H02K 5/04* (2006.01)
(Continued)

(52) U.S. Cl.
CPC ................ *H02K 5/04* (2013.01); *E02F 9/0866* (2013.01); *H02K 5/20* (2013.01); *B60K 2001/003* (2013.01); *B60K 2001/006* (2013.01)

(58) Field of Classification Search
CPC ............ H02K 5/20; H02K 5/04; H02K 7/006

USPC ....................... 310/52, 54, 58–59, 89, 91, 113
See application file for complete search history.

(56) References Cited

U.S. PATENT DOCUMENTS 5,679,087 A  * 10/1997  Lutz ......................... B60K 1/02
                                                              475/149
5,711,740 A    1/1998  Bakowski
(Continued)

FOREIGN PATENT DOCUMENTS

CN           1055576 C     8/2000
CN         101176249 A     5/2008
(Continued)

OTHER PUBLICATIONS

International Search Report Issued May 22, 2012 in PCT/JP12/02507 Filed Apr. 11, 2012.

*Primary Examiner* — Thanh Lam
(74) *Attorney, Agent, or Firm* — Oblon, McClelland, Maier & Neustadt, L.L.P.

(57) ABSTRACT

A hybrid construction machine that enables to efficiently cool a generator motor, while suppressing an increase in the entire length of a power unit. A motor housing is provided with a bulging portion which is configured to axially bulge from the inner periphery of a motor side connection surface toward an engine over the entire circumference thereof around an axis, and to engage with the inside of an engine housing; and a coolant passage which is configured to flow a coolant for cooling a stator therethrough. The inner peripheral surface of the motor housing including the inner peripheral surface of the bulging portion is configured to come into plane contact with the outer peripheral surface of the stator. The coolant passage is disposed at a position axially displaced from the motor side connection surface.

8 Claims, 2 Drawing Sheets

(51) Int. Cl.
*H02K 5/20* (2006.01)
*E02F 9/08* (2006.01)
*B60K 1/00* (2006.01)

(56) References Cited

U.S. PATENT DOCUMENTS

| | | | | |
|---|---|---|---|---|
| 5,875,691 | A * | 3/1999 | Hata | B60K 6/365 475/5 |
| 6,253,437 | B1 * | 7/2001 | Levin | B60K 6/26 29/271 |
| 6,424,065 | B1 * | 7/2002 | Vlemmings | B60K 6/26 290/38 C |
| 7,489,114 | B2 * | 2/2009 | Nomura | B60K 6/26 322/33 |
| 2002/0053838 | A1 * | 5/2002 | Okuda | F02N 11/04 310/59 |
| 2005/0039572 | A1 * | 2/2005 | Friedmann | B60K 6/36 74/661 |
| 2009/0302720 | A1 | 12/2009 | Chiba | |
| 2010/0193296 | A1 | 8/2010 | Sora | |
| 2011/0006545 | A1 | 1/2011 | Himmelmann | |

FOREIGN PATENT DOCUMENTS

| | | |
|---|---|---|
| CN | 101793343 A | 8/2010 |
| CN | 201629633 U | 11/2010 |
| CN | 101951062 A | 1/2011 |
| JP | 9 93871 | 4/1997 |
| JP | 2007 181273 | 7/2007 |
| JP | 2009-298369 A | 12/2009 |

* cited by examiner

HYBRID CONSTRUCTION MACHINE

TECHNICAL FIELD

The present invention relates to a hybrid construction machine provided with an engine, a generator motor connected to the engine, and means for cooling the generator motor.

BACKGROUND ART

The background art of the invention is described by an example of a hybrid shovel provided with a power unit which is configured by connecting an engine, a generator motor, and a hydraulic pump in series.

In a hybrid shovel, a generator motor and a hydraulic pump are connected to an engine. In the thus-configured hybrid shovel, a hydraulic actuator is driven by hydraulic oil to be ejected from the hydraulic pump. On the other hand, an electric storage device is charged by actuating the generator motor as a power generator, and actuating the generator motor as an electric motor by the electric power from the electric storage device, as necessary, assists the engine.

In a hybrid shovel, there is known a pump device configured such that a coolant passage is formed in a motor housing (see patent literature 1). In the pump device disclosed in patent literature 1, a stator, in other words, the entirety of a generator motor is cooled by heat exchange between a coolant such as water and the stator.

It is desirable to dispose the coolant passage on the outer periphery of the stator in terms of cooling efficiency.

However, in the case where an engine housing and a motor housing are connected to each other on the outer periphery of a stator, it is impossible to provide a coolant passage on the outer periphery of the stator. Accordingly, it is necessary to dispose a coolant passage at a position axially displaced from the outer periphery of the stator (i.e. a connection surface for connecting the engine housing and the motor housing).

In the above configuration, however, the coolant passage may be disposed far away from the stator. As a result, the cooling efficiency may be lowered by an increase of heat transfer loss.

There is proposed a configuration, as disclosed in patent literature 1, in which a stator is disposed at a position axially displaced from a connection surface for connecting an engine housing and a motor housing, and a coolant passage is disposed on the outer periphery of the stator (in other words, both of the stator and the coolant passage are disposed at a position displaced from the connection surface for connecting the engine housing and the motor housing).

The above configuration, however, may increase the size (axial length) of the motor housing in the axis direction thereof. This does not satisfy the demand for shortening the entire length of a power unit as much as possible in order to install the power unit in a limited space of an engine room.

CITATION LIST

Patent Literature

Patent Literature 1: Japanese Unexamined Patent Publication No. 2007-181273A

SUMMARY OF INVENTION

An object of the invention is to provide a hybrid construction machine that enables to efficiently cool a generator motor, while suppressing an increase in the entire length of a power unit.

In view of the above, the invention provides a hybrid construction machine provided with an engine including a crankshaft and an engine housing; and a generator motor including a rotor connected to the crankshaft, a stator disposed on a radially outer side of the rotor, and a motor housing which houses the rotor and the stator therein. The engine housing and the motor housing are configured such that an engine side connection surface of the engine housing and a motor side connection surface of the motor housing are connected to each other on a radially outer side of the stator. The motor housing is provided with a bulging portion and a coolant passage. The bulging portion is configured to axially bulge from an inner periphery of the motor side connection surface toward the engine over an entire circumference of the inner periphery of the motor side connection surface around an axis, and to engage with an inside of the engine housing. The coolant passage is configured to flow a coolant for cooling the stator therethrough. An inner peripheral surface of the motor housing including an inner peripheral surface of the bulging portion is configured to come into plane contact with an outer peripheral surface of the stator, and the coolant passage is disposed at a position axially displaced from the motor side connection surface.

According to the invention, it is possible to cool a generator motor in a satisfactory manner, while shortening the entire length of a power unit.

DESCRIPTION OF EMBODIMENTS

In the following, an embodiment of the invention is described referring to the accompanying drawings. The following embodiment is a mere example embodying the invention, and does not limit the technical scope of the invention.

Figure 1:
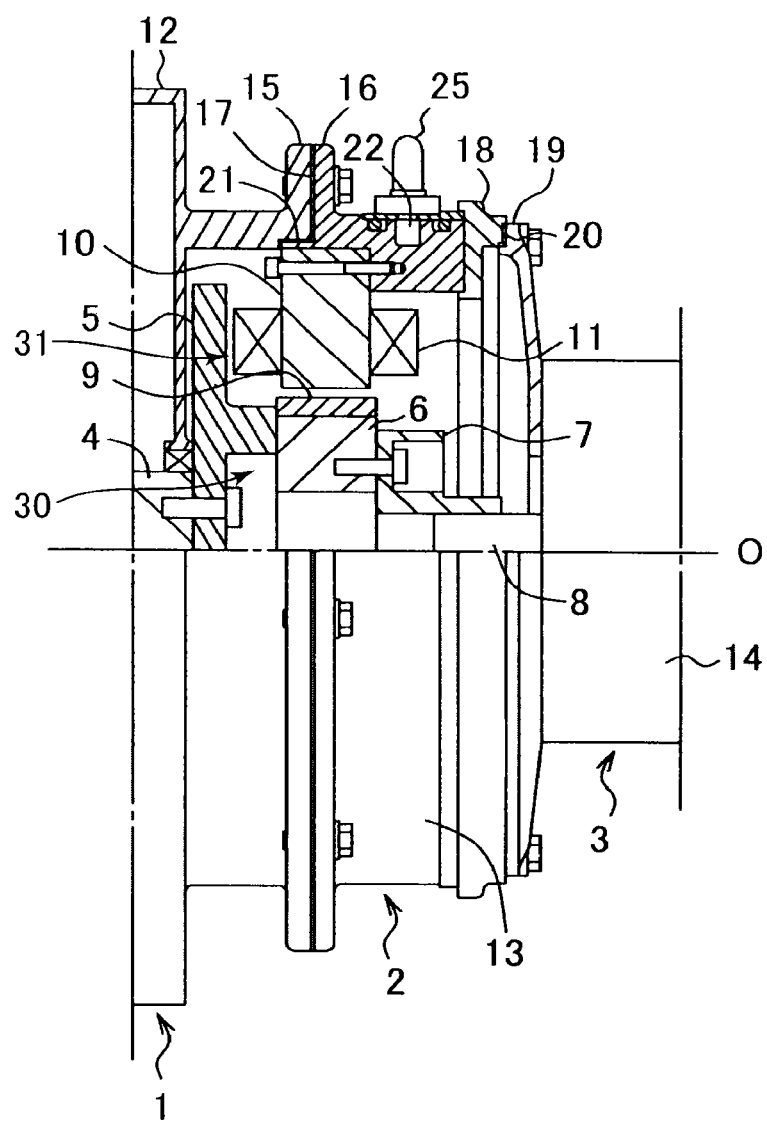
FIG. 1 is a half sectional side view of a connection portion between an engine, a generator motor, and a hydraulic pump in an embodiment of the invention.
Figure 2:
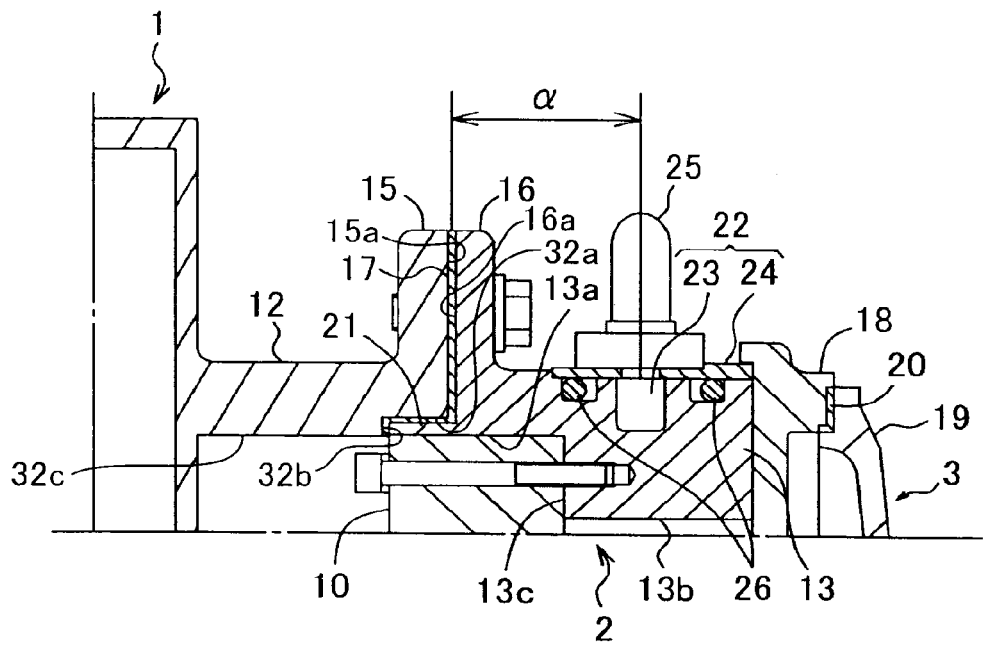
FIG. 2 is a partially enlarged view of FIG. 1.
Figure 3:
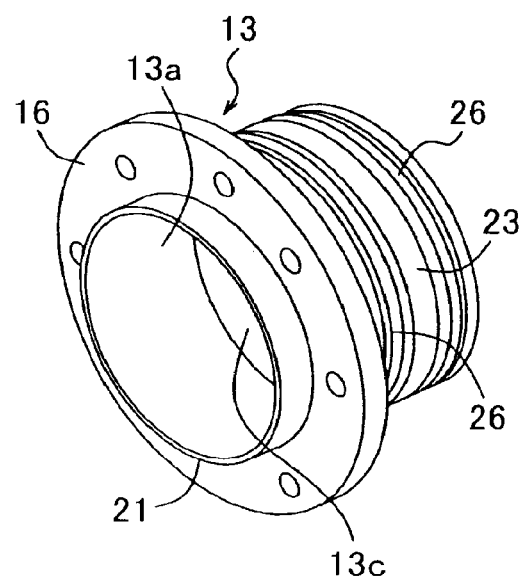
FIG. 3 is a perspective view of a motor housing shown in FIG. 1.

An embodiment of the invention is described referring to FIGS. 1 to 3.

As shown in FIG. 1, a hybrid shovel embodying the invention has a power unit configured by connecting an engine 1, a generator motor 2, and a hydraulic pump 3 in series.

Specifically, as shown in FIG. 1 and FIG. 2, the hybrid shovel is provided with the engine 1, the generator motor 2 connected to the engine 1, the hydraulic pump 3 connected to the generator motor 2, a flywheel 5 disposed between the engine 1 and the generator motor 2, a coupling 7 disposed between the generator motor 2 and the hydraulic pump 3, a coolant passage 22 for cooling the generator motor 2, a pipe 25 connected to the coolant passage 22, a heat insulating member 17 disposed between the engine 1 and the generator motor 2, and a heat insulating member 20 disposed between the generator motor 2 and the hydraulic pump 3.

The engine 1 is provided with a crankshaft 4 serving as an output shaft for the engine 1, and an engine housing 12 which houses main parts of the engine therein.

The flywheel 5 is mounted to the crankshaft 4 of the engine 1.

The generator motor 2 has a rotor 30 connected to the crankshaft 4, a stator 31 disposed on the outer periphery of the rotor 30, and a motor housing 13 which houses the rotor 30 and the stator 31 therein, and is connected to the engine housing 12 on the outer periphery of the stator 31. The rotor 30 has a rotor shaft 6 connected to the flywheel 5, and a rotor core 9 disposed on the outer periphery of the rotor shaft 6. The stator 31 has a stator core 10 disposed on the outer periphery of the rotor 30, and a coil 11 wound around the stator core 10.

The hydraulic pump 3 has a pump shaft 8 which is configured to be rotated by the power from the engine 1 and the power from the generator motor 2, and a pump housing 14 which houses the main parts of the hydraulic pump 3 therein. The pump shaft 8 is connected to the rotor shaft 6 via the coupling 7.

Next, a connection state between the engine housing 12 and the motor housing 13, and a connection state between the motor housing 13 and the pump housing 14 are respectively described.

(1) Connection State Between Engine Housing 12 and Motor Housing 13

The engine housing 12 and the motor housing 13 are connected to each other in a state that an engine side connection surface 15a of the engine housing 12 and a motor side connection surface 16a of the motor housing 13 are axially pressed against each other on the radially outer side of the stator 31 (stator core 10) over the entire circumference of the motor housing 13 around an axis (an axis in parallel to the center axis 0 in FIG. 1). Specifically, the engine housing 12 has an engine side flange 15 at an end thereof to be connected to the motor housing 13. The engine side flange 15 projects in the form of a flange radially outwardly than a portion of the engine housing 12 other than the engine side flange 15, and has the engine side connection surface 15a. Further, the motor housing 13 has a motor side flange 16 at an end thereof to be connected to the engine housing 12. The motor side flange 16 projects in the form of a flange radially outwardly than a portion of the motor housing 13 other than the motor side flange 16, and has the motor side connection surface 16a. A heat insulating member 17 is disposed between the engine side flange 15 and the motor side flange 16. Specifically, the heat insulating member 17 is disposed between the flange side connection surface 15a and the motor side connection surface 16a. In this state, the engine side flange 15 and the motor side flange 16 are bolt-connected to each other on the radially outer side of the stator 31 (stator core 10) at a number of circumferential positions thereof. By the bolt connection, the engine housing 12 and the motor housing 13 are connected to each other on the radially outer side of the stator 31 (stator core 10).

It is desirable to form the engine housing 12 of a magnetic member made of e.g. iron to secure an intended strength.

On the other hand, if the motor housing 13 is formed of a magnetic member, the efficiency of the generator motor may be lowered by leakage of magnetic force. In view of the above, it is desirable to form the motor housing 13 of a non-magnetic member.

(2) Connection State Between Motor Housing 13 and Pump Housing 14

The motor housing 13 has a flange 18 at an end thereof to be connected to the pump housing 14. The flange 18 projects in the form of a flange radially outwardly than a portion of the motor housing 13 other than the flange 18. Further, the pump housing 14 has a flange 19 at an end thereof to be connected to the motor housing 13. The flange 19 projects in the form of a flange radially outwardly than a portion of the pump housing 14 other than the flange 19. A heat insulating member 20 is disposed between the flanges 18 and 19. Specifically, the heat insulating member 20 is disposed between the connection surfaces of the flanges 18 and 19 facing each other. In this state, the flange 18 and the flange 19 are bolt-connected to each other at a number of circumferential positions thereof. By the bolt connection, the motor housing 13 and the pump housing 14 are connected to each other.

The motor housing 13 is formed into a tubular shape as a whole.

Specifically, the motor housing 13 has, on the inner periphery thereof, a large diameter surface 13a, a small diameter surface 13b having a diameter smaller than the diameter of the large diameter surface 13a, and a connection surface 13c formed between the large diameter surface 13a and the small diameter surface 13b in such a manner as to connect between the large diameter surface 13a and the small diameter surface 13b in the form of a step (see FIG. 2).

Further, the motor housing 13 has a bulging portion 21 which bulges from the inner periphery of the motor side connection surface 16a axially toward the engine over the entire circumference of the motor housing 13 around an axis. In other words, the bulging portion 21 is formed on the inner periphery side of an end of the motor housing 13 on the engine housing 12 side connected to the engine housing 12. The bulging portion 21 axially projects from the motor side connection surface 16a toward the engine housing 12. Further, the bulging portion 21 is annularly formed over the entire circumference of the motor housing 13 around the centerline O shown in FIG. 1.

The bulging portion 21 is engageable with the inside of the engine housing 12 in a state that the engine housing 12 and the motor housing 13 are disposed concentrically to each other. Specifically, as shown in FIG. 2, the engine housing 12 has an engaging hole 32a engageable with the bulging portion 21, a small diameter hole 32c having a diameter smaller than the diameter of the engaging hole 32a, and a contact surface 32b formed between the engaging hole 32a and the small diameter hole 32c. The engaging hole 32a is provided with an inner surface having the centerline O shown in FIG. 1 as a center. Further, the outer diameter of the bulging portion 21 and the inner diameter of the engaging hole 32a are respectively set to such values that the bulging portion 21 and the engaging hole 32a are engageable with each other. In this embodiment, the heat insulating member 17 is disposed between the outer surface of the bulging portion 21 and the inner surface of the engaging hole 32a. Accordingly, the outer diameter of the bulging portion 21 and the inner diameter of the engaging hole 32a are determined, taking into consideration of the thickness of the heat insulating member 17. The contact surface 32b is contacted with a tip surface of the bulging portion 21 in a state that the heat insulating member 17 is interposed between the contact surface 32b and the tip surface of the bulging portion 21.

The inner surface of the bulging portion 21 is included in the large diameter surface 13a. The large diameter surface 13a is configured to come into plane contact with the outer peripheral surface of the stator core 10 in the entire range of the axial width of the stator 31 (in a direction in parallel to the centerline O in FIG. 1). On the other hand, the connection surface 13c is configured to come into plane contact with a side surface of the stator core 10 on the opposite side of the engine 1 (on the hydraulic pump 3 side).

The coolant passage 22 is formed in the motor housing 13, and is configured to flow a coolant (a fluid such as water or oil, or a coolant gas) for cooling the stator 31 therethorugh. Specifically, the coolant passage 22 is disposed at a position axially displaced from the motor side connection surface 16a, in other words, axially displaced from a radially outer side position of the stator 31 on the opposite side of the engine 1 (on the hydraulic pump 3 side).

In FIG. 2, the reference sign a denotes a displacement amount of the coolant passage 22 from the motor side connection surface 16a. It is desirable to minimize the displacement amount a (in other words, to dispose the coolant passage 22 at a position proximal to the stator 31) for enhancing the heat transfer efficiency.

Specifically, the coolant passage 22 is formed on the outer peripheral surface of the motor housing 13. The coolant passage 22 is defined by a concave groove 23 circumferentially extending and opening to the outer peripheral side of the motor housing 13, and the inner peripheral surface of a cover 24 which is disposed on the outer peripheral surface of the motor housing 13 in such a manner as to cover the opening of the concave groove 23. Each of the concave groove 23 and the cover 24 is formed over the entire circumference of the motor housing 13.

The pipe 25 is connected to the coolant passage 22. By actuation of an unillustrated pump, the coolant is supplied from the outside into the coolant passage 22 via the pipe 25, and is returned to the pump from the coolant passage 22 via the pipe 25. In other words, the coolant circulates between the coolant passage 22 and the pump. It is preferable to provide a mechanism for cooling the coolant between the coolant passage 22 and the pump.

Referring to FIG. 2 and FIG. 3, the reference sign 26 denotes an O ring that seals between the cover 24 and the motor housing 13. Each of the O rings 26 is attached to an attachment portion of the cover 24.

To avoid complication on the illustration of the drawings, in FIG. 1, the reference signs of the large diameter surface 13a, the small diameter surface 13b, and the connection surface 13c of the motor housing 13, and the concave groove 23 and the cover 24 are omitted.

Further, referring to FIG. 3, the illustration of the cover 24 and the pipe 25 for the coolant passage 22 is omitted.

As described above, in this embodiment, the engine housing 12 (engine side connection surface 15a) and the motor housing 13 (motor side connection surface 16a) are connected to each other on the radially outer side of the stator 31, and the coolant passage 22 is disposed to be axially displaced from the stator 31 (motor side connection surface 16a). In this embodiment, based on the above configuration, the motor housing 13 is further provided with the bulging portion 21 that bulges toward the engine housing 12, and the inner peripheral surface (large diameter surface 13a) of the motor housing 13 including the inner peripheral surface of the bulging portion 21 is configured to come into plane contact with the outer peripheral surface of the stator 31 (stator core 10). Accordingly, increasing the contact surface area (heat transfer surface area) between the stator 31 and the motor housing 13 makes it possible to enhance the cooling efficiency.

Thus, it is possible to sufficiently compensate for the heat transfer loss resulting from the displacement as described above by increasing the contact surface area.

In other words, it is possible to secure an intended cooling performance of the stator 31 (generator motor 2), without the need of extending the axial length of the motor housing 13.

Further, the embodiment provides the following advantages.

(i) The inner peripheral surface (large diameter surface 13a) of the motor housing 13 including the inner peripheral surface of the bulging portion 21 is configured to come into plane contact with the outer peripheral surface of the stator 31 (stator core 10) in the entire range of the axial width of the stator 31. Further, the connection surface 13c of the motor housing 13 is configured to come into plane contact with a side surface of the stator 31 on the opposite side of the engine (on the hydraulic pump 3 side). Thereby, it is possible to further increase the heat transfer surface area.

(ii) The bulging portion 21 for use in increasing the heat transfer surface area is engaged with the inside of the engine housing 12 (in other words, the bulging portion 21 is utilized as an engaging portion to be engaged with the engine housing 12). Accordingly, it is possible to secure a degree of concentricity between the engine housing 12 and the motor housing 13, and to enhance the assembling performance.

(iii) The coolant passage 22 is formed on the outer peripheral surface of the motor housing 13. Accordingly, unlike a configuration, in which a coolant passage 22 is formed on the inner peripheral side of a motor housing 13, there is no or less likelihood that the stator 31 or the rotor 30 may be contacted with a coolant in case of leakage of the coolant.

Furthermore, the coolant passage 22 is defined by the concave groove 23 formed in the motor housing 13, and the cover 24. Accordingly, as compared with a configuration, in which a coolant passage 22 is independently mounted on the outer periphery of a motor housing 13, the above configuration is advantageous in reducing the cost.

(iv) The ends of the engine housing 12 and of the motor housing 13 to be connected to each other are respectively formed with the flanges 15 and 16 that project radially outwardly in the form of a flange, and the flanges 15 and 16 are connected to each other. Accordingly, it is possible to use the flange 15 and the flange 16 for use in connecting between the engine housing 12 and the motor housing 13, as heat releasing fins for heat exchange with the external air. Thus, enhancing the heat releasability of the engine housing 12 and of the motor housing 13 makes it possible to further enhance the cooling efficiency.

(v) The heat insulating member 17 is disposed between the engine housing 12 and the motor housing 13 (between the flanges 15 and 16), and the heat insulating member 20 is disposed between the motor housing 13 and the pump housing 14 (between the flanges 18 and 19). Accordingly, in a hybrid construction machine configured such that the engine 1, the generator motor 2, and the hydraulic pump 3 are connected in series, it is possible to suppress heat transfer between the engine 1 and the generator motor 2, and to suppress heat transfer between the generator motor 2 and the hydraulic pump 3 by providing the heat insulating members 17 and 20. Thus, suppressing the heat transfer from the engine 1 or the hydraulic pump 3 as a heat source to the motor housing 13 by the heat insulating members 17 and 20 makes it possible to enhance the cooling efficiency of the stator 31 by the coolant passage 22.

Alternatively, only the heat insulating member 17 may be disposed between the engine housing 12 and the motor housing 13, or only the heat insulating member 20 may be disposed between the motor housing 13 and the pump housing 14. Further, the heat insulating members 17 and 20 may be omitted.

Further, the invention is not limited to a hydraulic shovel. The invention is widely applicable to a hybrid construction machine configured such that an engine, a generator motor, and a hydraulic pump are coaxially connected to each other, or a hybrid construction machine configured such that an engine and a generator motor are coaxially connected to each other, and that a hydraulic pump is connected to the engine in a state that the hydraulic pump is disposed in parallel to the generator motor.

The foregoing embodiment mainly includes the invention having the following features.

The invention provides a hybrid construction machine provided with an engine including a crankshaft and an engine housing; and a generator motor including a rotor connected to the crankshaft, a stator disposed on a radially outer side of the rotor, and a motor housing which houses the rotor and the stator therein. The engine housing and the motor housing are configured such that an engine side connection surface of the engine housing and a motor side connection surface of the motor housing are connected to each other on a radially outer side of the stator. The motor housing is provided with a bulging portion and a coolant passage. The bulging portion is configured to axially bulge from an inner periphery of the motor side connection surface toward the engine over an entire circumference of the inner periphery of the motor side connection surface around an axis, and to engage with an inside of the engine housing. The coolant passage is configured to flow a coolant for cooling the stator therethrough. An inner peripheral surface of the motor housing including an inner peripheral surface of the bulging portion is configured to come into plane contact with an outer peripheral surface of the stator, and the coolant passage is disposed at a position axially displaced from the motor side connection surface.

According to the invention, the engine housing (engine side connection surface) and the motor housing (motor side connection surface) are connected to each other on the radially outer side of the stator of the generator motor, and the coolant passage is disposed at a position axially displaced from the stator (motor side connection surface). In the invention, based on the above configuration, the motor housing is further provided with the bulging portion that bulges toward the engine housing, and the inner peripheral surface of the motor housing including the inner peripheral surface of the bulging portion is configured to come into plane contact with the outer peripheral surface of the stator. Accordingly, increasing the contact surface area (heat transfer surface area) between the stator and the motor housing makes it possible to enhance the cooling efficiency.

In other words, it is possible to secure an intended cooling performance of the stator (generator motor), without the need of extending the axial length of the motor housing.

The term "axis" in the present invention means an axis in parallel to an axis of rotation of a crankshaft or an axis of rotation of a rotor.

In the hybrid construction machine, preferably, the inner peripheral surface of the motor housing including the inner peripheral surface of the bulging portion may be configured to come into plane contact with the outer peripheral surface of the stator in an entire range of an axial width of the stator.

According to the aspect, maximizing the contact surface area makes it possible to enhance the heat transfer performance.

In the case where a stator has a stator core and a coil wound around the stator core, the expression "an entire range of an axial width of the stator" means the entire range of the axial width of the stator coil. However, this does not exclude a case, in which the inner peripheral surface of the motor housing comes into contact with the outer peripheral surface of the coil.

In the hybrid construction machine, preferably, the motor housing may include, on an inner periphery thereof, a large diameter surface, a small diameter surface having a diameter smaller than a diameter of the large diameter surface, and a connection surface formed between the large diameter surface and the small diameter surface in such a manner as to connect between the large diameter surface and the small diameter surface in the form of a step. The inner peripheral surface of the bulging portion may be included in the large diameter surface. The large diameter surface may be configured to come into plane contact with the outer peripheral surface of the stator, and the connection surface may be configured to come into plane contact with a side surface of the stator on an opposite side of the engine.

According to the above aspect, it is also possible to bring the motor housing into plane contact with the side surface of the stator. Accordingly, it is possible to further increase the heat transfer surface area between the motor housing and the stator.

In the hybrid construction machine, preferably, the bulging portion of the motor housing may be configured to be engageable with the inside of the engine housing in a state that the engine housing and the motor housing are disposed concentrically to each other.

According to the above aspect, it is possible to utilize the bulging portion for use in increasing the heat transfer surface area, as an engaging portion to be engaged with the engine housing. Thus, it is possible to secure a degree of concentricity between the engine housing and the motor housing, and to enhance the assembling performance.

In the hybrid construction machine, preferably, the coolant passage may be formed on an outer peripheral surface of the motor housing, and may be defined by a concave groove circumferentially extending and opening to an outer peripheral side of the motor housing, and an inner peripheral surface of a cover which is disposed on the outer peripheral surface of the motor housing in such a manner as to cover an opening of the concave groove.

According to the above configuration, the coolant passage is formed on the outer peripheral surface of the motor housing. Accordingly, unlike a configuration, in which a coolant passage is formed on the inner peripheral side of a motor housing, there is no or less likelihood that the stator or the rotor may be contacted with a coolant in case of leakage of the coolant.

Furthermore, according to the above aspect, the coolant passage is configured by the concave groove formed in the motor housing, and the cover. Accordingly, as compared with a configuration, in which a coolant passage is independently mounted on the outer periphery of a housing, the above configuration is advantageous in reducing the cost.

In the hybrid construction machine, preferably, the engine housing may have an engine side flange at an end thereof to be connected to the motor housing, the engine side flange being configured to project radially outwardly than a portion of the engine housing other than the engine side flange, and having the engine side connection surface. The motor housing may have a motor side flange at an end thereof to be connected to the engine housing, the motor side flange being configured to project radially outwardly than a portion of the motor housing other than the motor side flange, and having the motor side connection surface. The engine side flange and the motor side flange may be connected to each other.

According to the above aspect, it is possible to use the engine side flange and the motor housing side flange for use in connecting between the engine housing and the motor housing, as heat releasing fins for heat exchange with the external air. Thus, enhancing the heat releasability of the engine housing and of the motor housing makes it possible to further enhance the cooling efficiency.

Preferably, the hybrid construction machine may be further provided with a hydraulic pump including a pump housing to be connected to a portion of the motor housing on an opposite side of the engine, and a heat insulating member which is disposed at least either between the engine housing and the motor housing, or between the motor housing and the pump housing.

According to the above aspect, in a hybrid construction machine configured such that an engine, a generator motor, and a hydraulic pump are connected in series, it is possible to suppress heat transfer between the engine and the generator motor, and to suppress heat transfer between the generator motor and the hydraulic pump by providing a heat insulating member. Thus, suppressing the heat transfer from the engine and/or the hydraulic pump as a heat source to the motor housing by the heat insulating member makes it possible to enhance the cooling efficiency of the stator by the coolant passage.

Preferably, the hybrid construction machine may be further provided with a heat insulating member which is disposed between the engine side connection surface and the motor side connection surface.

According to the above aspect, it is possible to suppress heat transfer from the engine to the motor housing by the heat insulating member.

INDUSTRIAL APPLICABILITY

According to the invention, it is possible to cool a generator motor in a satisfactory manner, while shortening the entire length of a power unit.

DESCRIPTION OF REFERENCE SIGNS

1: engine
2: generator motor
3: hydraulic pump
4: crankshaft
12: engine housing
13: motor housing
13a: large diameter surface of motor housing
13b: small diameter surface of motor housing
13c: connection surface of motor housing
14: pump housing
15: flange of engine housing
16: flange of motor housing
17, 20: heat insulating member
18: flange of motor housing
19: flange of pump housing
21: bulging portion
22: coolant passage
23: concave groove
24: cover
30: rotor
31: stator

The invention claimed is:

1. A hybrid construction machine, comprising:
an engine including a crankshaft and an engine housing; and
a generator motor including
a rotor connected to the crankshaft,
a stator disposed on a radially outer side of the rotor, and
a motor housing which houses the rotor and the stator therein, wherein
the engine housing and the motor housing are configured such that an engine side connection surface of the engine housing and a motor side connection surface of the motor housing are connected to each other on a radially outer side of the stator,
the motor housing is provided with a bulging portion and a coolant passage, the bulging portion being configured to axially bulge from an inner periphery of the motor side connection surface toward the engine over an entire circumference of the inner periphery of the motor side connection surface around an axis, and to engage with an inside of the engine housing, the coolant passage being configured to flow a coolant for cooling the stator therethrough, and
an inner peripheral surface of the motor housing including an inner peripheral surface of the bulging portion is configured to come into plane contact with an outer peripheral surface of the stator, and the coolant passage is disposed at a position axially displaced from the motor side connection surface.

2. The hybrid construction machine according to claim 1, wherein
the inner peripheral surface of the motor housing including the inner peripheral surface of the bulging portion is configured to come into plane contact with the outer peripheral surface of the stator in an entire range of an axial width of the stator.

3. The hybrid construction machine according to claim 1, wherein
the motor housing includes, on an inner periphery thereof, a large diameter surface, a small diameter surface having a diameter smaller than a diameter of the large diameter surface, and a connection surface formed between the large diameter surface and the small diameter surface in such a manner as to connect between the large diameter surface and the small diameter surface in the form of a step,
the inner peripheral surface of the bulging portion is included in the large diameter surface, and
the large diameter surface is configured to come into plane contact with the outer peripheral surface of the stator, and the connection surface is configured to come into plane contact with a side surface of the stator on an opposite side of the engine.

4. The hybrid construction machine according to claim 1, wherein
the bulging portion of the motor housing is configured to be engageable with the inside of the engine housing in a state that the engine housing and the motor housing are disposed concentrically to each other.

5. The hybrid construction machine according to claim 1, wherein
the coolant passage is formed on an outer peripheral surface of the motor housing, and is defined by a concave groove circumferentially extending and opening to an outer peripheral side of the motor housing, and an inner peripheral surface of a cover which is disposed on the outer peripheral surface of the motor housing in such a manner as to cover an opening of the concave groove.

6. The hybrid construction machine according to claim 1, wherein
the engine housing has an engine side flange at an end thereof to be connected to the motor housing, the engine side flange being configured to project radially outwardly than a portion of the engine housing other than the engine side flange, and having the engine side connection surface,
the motor housing has a motor side flange at an end thereof to be connected to the engine housing, the motor side flange being configured to project radially outwardly than a portion of the motor housing other than the motor side flange, and having the motor side connection surface, and
the engine side flange and the motor side flange are connected to each other.

7. The hybrid construction machine according to claim 1, further comprising:

a hydraulic pump including a pump housing to be connected to a portion of the motor housing on an opposite side of the engine, and a heat insulating member which is disposed at least either between the engine housing and the motor housing, or between the motor housing and the pump housing.

8. The hybrid construction machine according to claim 1, further comprising:

a heat insulating member which is disposed between the engine side connection surface and the motor side connection surface.

* * * * *